United States Patent [19]

Kaska

[11] Patent Number: 4,474,332

[45] Date of Patent: Oct. 2, 1984

[54] ELECTROMAGNETIC FUEL INJECTOR HAVING IMPROVED RESPONSE RATE

[75] Inventor: William J. Kaska, West Bloomfield, Mich.

[73] Assignee: Essex Group, Inc., Fort Wayne, Ind.

[21] Appl. No.: 338,814

[22] Filed: Jan. 11, 1982

[51] Int. Cl.$^{3}$ ........................ F16K 31/06; F02M 51/06

[52] U.S. Cl. ...................................... 239/585; 251/141

[58] Field of Search ......................... 239/585; 251/141

[56] References Cited

U.S. PATENT DOCUMENTS 3,731,881 5/1973 Dixon et al. ........................ 239/585

4,311,280 1/1982 Knape ................................ 239/585

4,356,980 11/1982 Krauss ................................ 239/585

*Primary Examiner*—Andres Kashnikow

*Attorney, Agent, or Firm*—Stephen A. Schneeberger

[57] ABSTRACT

An electromagnetically operated fuel injector includes a disk-type armature and a ball-type valve joined to the armature. The response characteristics and speed of the injector's ball valve are improved by modifying the surface structure of the valve ball to reduce its mass. Preferably a plurality of plunge-ground "flats" are formed on the surface of the ball.

7 Claims, 2 Drawing Figures

ELECTROMAGNETIC FUEL INJECTOR HAVING IMPROVED RESPONSE RATE

Description

1. Technical Field

The invention relates to fuel injectors and more particularly to electromagnetically operated fuel injection valves for internal combustion engines. More particularly still, the invention relates to an improvement in the structure of electromagnetically operated fuel injection valves.

2. Background Art

There has been considerable development of fuel injectors, particularly electromagnetically operated injectors for spark ignited engines, in the quest to improve fuel economy, increase engine operating performance and/or to reduce various emissions from the engine. In pursuing these goals, it has also been an objective to limit costs to the extent possible. One factor in that effort is the provision of an electromagnetically operated fuel injector which provides a substantially linear response to a relatively wide range of electrical control pulse widths. The amount of fuel injected per pulse by an injector is a function of the operating pressures, the sizing of the flow paths or metering orifice, and the duration of the fuel injection event. Inasmuch as fuel pressure and orifice size are typically constant, variations in the amount of fuel injected are obtained by varying the length of the electrical pulse which opens the valve in the injector and maintains it open. Typically, the fuel requirements per pulse are proportional to the loading of the engine. Accordingly, it is desirable that an injector be capable of responding to a wide range of electrical control pulse widths, so long as that response is accurate and bears a substantially linear relationship to the control pulse width.

It is desirable to have a wide dynamic range of fuel injector pulse widths, in order to optimize the emission performance, drivability and system cost of a fueling system. Demand for the fuel injection pulses having a duration as short as 1.2-1.5 milliseconds is typically necessitated by a decrease in load, as in an engine overrun condition.

In an electromechanically actuated fuel injector, the armature of an electromagnetic motor or solenoid is in some manner connected with a valve element such that energization or de-energization of the electomagnet is operative to move, or permit movement of, the valve between open and closed positions. Certain factors, such as electromagnetic damping in the magnetic circuit and/or the mass of the armature and valve may serve to retard the rate of response of the valve to the electrical control signal. In U.S. Pat. No. 2,881,980 for Fuel Injection Nozzle issued Apr. 14, 1959 to Beck et al, there is disclosed the use of slots in the structure of the magnetic circuit for minimizing eddy currents and thereby improving the response rates. In an effort to reduce the mass of the valve, U.S. Pat. No. 4,116,389 for Electromagnetic Fuel Injection Valve by Furtah et al issued Sept. 26, 1978, and assigned to the assignee of the present invention, discloses the use of a low-mass, non-magnetic plunger member or pintle valve. More recently, U.S. Pat. No. 4,186,883 for Electromagnetic Fuel Injection Valve with Swirl means issued Feb. 5, 1980 to M. E. Robling and assigned to the assignee of the present invention, has preferably substituted a ball type valve for the pintle-type valve of U.S. Pat. No. 4,116,389 to minimize or elimate the tight tolerances required by that latter valve. While these features have improved the response times of the injector valve to the electrical control signal, further improvement is a continuing objective.

Accordingly, it is a principal object of the present invention to provide an improved electromagnetically actuated fuel injector. Included in this object is the provision of a fuel injector of the ball-valve type having a substantially linear response to an extened range of electrical control pulse widths. Further included is the object of improving the response rates of the armature and valve to electrical control pulses of shortened duration.

It is a further object of the present invention to provide an improved electromagnetically actuated fuel injector of the ball-valve type in which the mass of at least the valve is reduced. Included within this object is the provision of such reduction in the mass of the ball valve in a relatively simple and economical manner.

In accordance with the present invention, there is provided an electromagnetically operated fuel injection valve having a housing which includes a fuel inlet and a fuel discharge outlet. Included within the injector housing is means for forming a liquid flow path between the inlet and the discharge outlet. Included in the flow path is an annular valve seat, and a valve for displacement between open and closed positions relative to the valve seat. Also included in the housing is an electromagnetic circuit including an armature operatively connected to the valve for displacing the valve from one of the opened and closed positions to the other in response to actuation of the electromagnetic circuit. The armature is a disk having a major diameter and having a thickness substantially less than the major diameter. The valve is joined with the disk, as by bonding, such that the armature and valve move in unison in response to the actuation of the electromagnetic circuit. More specifically in accordance with the invention, the valve is substantially a sphere which includes a normal convex surface for contact with the valve seat and which additionally includes a plurality of modified surfaces recessed from the normal convex surface to effect weight reduction thereof. The modified surfaces are preferably flat and may be arranged in quadrature about the sphere. The "flats" are conveniently formed by plunge grinding the ball after it is affixed to the armature disk.

The armature is substantially circular and includes a plurality of flow apertures extending axially therethrough. The combined mass of the armature and the ball valve having the modified surfaces is significant, being at least about 1.5% less than the combined mass of the same armature and same ball valve as a complete sphere without modification of the surfaces. At least a portion of the ball valve may be retained within a tubular valve body, the interior diameter of which is only slightly larger than that of the major diameter of the ball valve to assist in the alignment thereof.

BEST MODE FOR CARRYING OUT THE INVENTION

Figure 1:
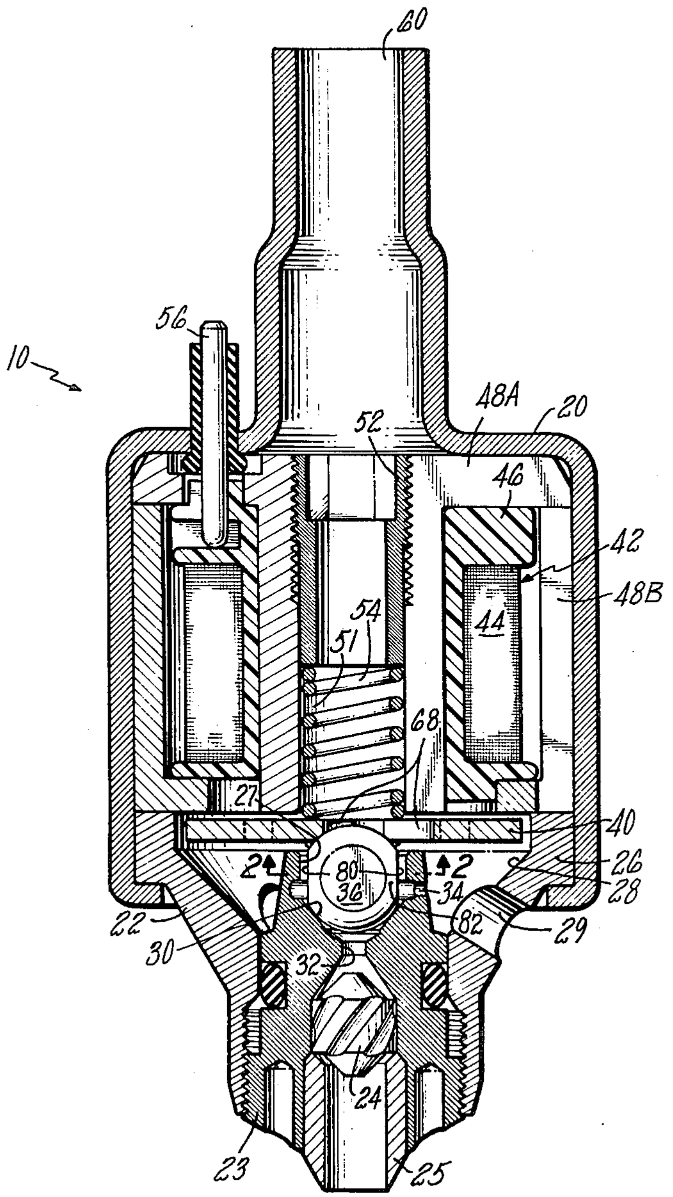
FIG. 1 is an elevational sectional view of an improved electromagnetically actuated fuel injector in accordance with the invention.

Referring to FIG. 1, there is illustrated an elevational sectional view of an electromagnetically actuated fuel injector 10 in accordance with the present invention. A generally elongated tubular housing is provided by a tubular housing member 20 of non-magnetic material, a valve container ring 22 and a valve body assembly comprised of a valve body 23, a swirl disk 24 and an exit nozzle 25. The housing member 20 comprises the upper portion of the injector housing, with the lower remaining portion being formed by valve container ring 22 and the valve body assembly. The housing member 20 includes a lower portion of relatively large diameter and an upper portion of relatively smaller diameter. The lower end of housing member 20 is deformed inwardly to provide an upwardly facing flange which engages a downwardly facing shoulder on an annular rim 26 of the valve container ring 22 to axially retain the container ring.

The diameter of the annular rim 26 of ring 22 is sized for close-fitting insertion into the housing member 20. A first conically-inwardly tapered section of container ring 22 depends from ring 26, followed by a second lower substantially cylindrical section.

The valve body 23 is a generally tubular member which is threadedly inserted into and retained within the lower cylindrical section of the valve container ring 22. The valve body 23 includes an upper portion which extends within the conically-walled section of the valve container ring 22 in spaced relation therewith to form an annular fuel chamber 28 therebetween. One or more ports 29 extend through the conical wall of valve container ring 22 to provide an inlet opening to the fuel chamber 28 of injector 10 from a source of pressurized fuel (not shown) such as gasoline.

The valve body 23 includes a central bore 27 which is cylindrical at its upper end and is tapered conically inward therebelow to form an annular valve-seating surface 30 and, furtherbelow, provides a cylindrical metering orifice 32 of relatively small diameter. This central bore in valve body 23 extends through the length thereof and, below metering orifice 32, opens to a larger diameter in which a swirl disk 24 may be installed for imparting a tangential component to the flow of fluid therethrough. A tubular exit nozzle 25 may be press-fitted into the bore in the lower end of the valve body 23 for retaining the swirl disk 24 and for providing the final discharge path from the injector for fuel being injected into the engine.

Fuel from reservoir 28 is admitted to the bore 27 within valve body 23 by means of one, or preferably a plurality, of ports 34 extending either tangentially or radially through the valve body 23 above the valve seat 30. Fuel from reservoir 28 may also enter the top of the central bore 27 in valve body 23 over the uppermost end of the valve body. A modified ball valve element 36 to be described hereinafter in greater detail is positioned within the uppermost part of the central bore 27 in valve body 23 and cooperates with the valve seating surface 30 to prevent or allow the flow of fuel from reservoir 28 and parts 34 for discharge to the engine via the metering orifice 32, the swirl disk 24 and the exit nozzle 25.

The modified ball valve 36 is attached, as by resistance welding, to a flat-faced washer-shaped armature 40 of magnetic material such as steel. Armature 40 is generally circular, its diameter extending transversely of the centerline or axis of injector 10, and its thickness in the axial direction being substantially less than its diameter. The armature 40 comprises part of an electromagnetic motor or solenoid 42 which is concentrically housed within housing member 20. The solenoid 42 selectively controls the axial positioning of armature 40 and thus modified ball valve 36 to allow or prevent the discharge of fuel from injector 10 into the engine.

The solenoid 42 in entirely contained within the lower portion of housing member 20 and includes a wire coil 44 coaxially disposed on a tubular, non-magnetic spool or bobbin 46 which is in turn coaxially disposed between the radially inner and outer sections 48A and 48B respectively of an annular magnetic frame 48. The inner section 48A of the magnetic frame 48 includes a cylindrical, fluid-passing bore 51 extending coaxially therethrough, into the top end of which is threadedly inserted a tubular spring adjuster 50. The spring adjuster 50 includes a fluid-passing bore 52 extending coaxially therethrough. A helical compression spring 54 is positioned coaxially within the central bore of magnetic frame 48A axially intermediate and in opposing contact with the lower end of spring adjuster 52 and the upper surface of armature 40 to apply a downward, or closing, biasing force to the upper surface of armature 40 and thus also to the modified ball valve 36. Adjustment of the axial positioning of adjuster 52 is used to vary the biasing force applied by spring 54 to the modified ball valve 36.

The small diameter upper portion of housing member 20 is, in the illustrated embodiment, open at its upper end to provide a return outlet opening 60 from which fuel may be returned to a reservoir and pump, typically via a pressure regulator (not shown). Fuel admitted to the reservoir 28 via inlet opening 29 is able to continuously pass upwardly through and around the armature 40, as will be discussed hereinafter in greater detail, and thence through the central bore 51 and, to some extent, through the region of solenoid 42 and finally out through the return outlet opening 60. This flow path is not necessarily present in all injectors, but in most instances the armature 40 and ball valve 36 will be continuously immersed in fuel. The other flow path in the system is, of course, the valved flow path from reservoir 28 which extends past the valve seat 30, metering orifice 32 and out through the exit nozzle 25 when the modified ball valve 36 is not seated on surface 30, or in other words, is in its open position.

The ends of the electrical coil 44 are connected (not shown) to a respective pair of terminals 56 (only one being shown) which extend through the housing member 20 in insulated and fluid-sealed relation therewith. Application of an appropriate electrical potential to the terminals 56 is effective to energize the solenoid 42 and thereby magnetically attract and displace the armature 40 upwardly against the biasing force of spring 54, to open the valve. Correspondingly, when the energizing potential is removed from terminals 56, the magnetic field associated with solenoid 42 rapidly collapses and the armature 40 is urged downwardly by the bias spring 54 to close the valve.

Figure 2:
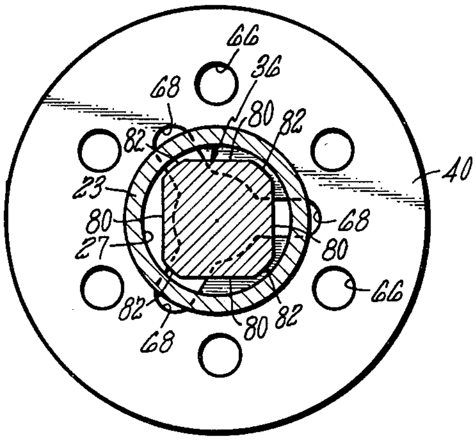
FIG. 2 is a sectional view of the armature and modified ball valve taken generally along line 2—2 of FIG. 1.

It is desirable that the electromagnetic system be capable of rapidly and faithfully responding to and tracking electrical control signals having a relatively wide range of widths or durations and moreover, that the armature 30 and ball valve 36 be similarly capable of accurately and rapidly responding to the actuation, i.e.

energization and de-energization, of the solenoid 42. It is particularly desirable that such responses exist for control pulses of short duration, i.e. in the range of 1.2 to 1.5 milliseconds. To enhance the operating speed of the solenoid 42, the inner and outer sections 48A and 48B respectively of the magnetic frame have been slotted to reduce or prevent eddy currents. Moreover, inasmuch as the magnetic armature 40 is drawn into contact with the inwardly extending flange at the base of outer magnetic frame 48B when the valve is in its open position, the armature of magnetic material is preferably coated with a non-magnetic material such as chrome or electroless nickel so as to provide a small non-magnetic air gap between it and the frame assembly to facilitate rapid release when coil 44 is de-energized. Further still, the armature 40 includes a plurality of openings extending axially therethrough for permitting the continuous bypass of fluid to the return outlet opening 60 and to also minimize liquid resistance to axial displacement of the armature as it is actuated between its open and closed positions. In this latter regard and additionally referring to FIG. 2, the armature 40 includes a circular central opening which is occluded by the upper end of modified ball valve 36, which opening additionally includes three equiangularly spaced, radially-outwardly extending labes 68 which are not occluded by the valve 36. Moreover, armature 40 additionally includes six circular openings 66 equiangularly spaced around its center and extending axially therethrough.

Each of the aforementioned features contributes to the linear and faithful response of the valve 36 to an electrical control signal of short duration. However, in accordance with the present invention, additional improvement is obtained by a reduction in the mass of the moving system comprised of armature 40 and ball valve 36 and more specifically, in the reduction of the mass of the ball valve element 36. The provision of flow openings 66 and 68 in relatively thin armature 40 in accordance with the teachings of the aforementioned U.S. Pat. No. 4,186,883 precludes the removal of any further mass of that structure if its magnetic function and mechanical integrity are to be maintained. On the other hand, ball valve element 36 which has heretofore comprised a relatively small, fully spherical structure may be modified to significantly reduce its mass without affecting its mechanical integrity. Moreover, because the ball valve 36 is typically of a low-reluctance magnetic material, such as Type 440C stainless steel, such modification will have relatively little effect on the magnetic operating properties of the injector.

The modified ball valve element 36 is provided by forming one or more modified surfaces thereon recessed from the normal convex surface of the sphere. In a preferred embodiment, the surface modification is obtained with a plurality of flat surfaces or "flats" formed about the spherical surface. These flats may be simply and economically machined in the surface of the ball, as for instance by plunge grinding the flats after the ball has been affixed to the armature 40. With reference to the axis or centerline of the tubular injector 10, four flats 80 are arranged in quadrature about the midregion of the spherical ball to form the modified ball valve 36. In a preferred embodiment, the modified ball valve 36 is formed from a stainless steel ball or sphere having a normal diameter of about 5.5 millimeters and into which the recessed flat circular surfaces 80 are formed, each circular flat 80 having a diameter of about 3.3 millimeters. In this manner, approximately 6% of the mass of the ball 36 will have been removed which results in a reduction of about 1.5% in the mass of the complete moving structure comprised of armature 40 and the ball valve 36.

In the preferred embodiment, the diameter of the flats 80 is such that adjacent flats do not overlap, and small convex connecting portions 82 of the surface of the original sphere separate the flats. The wall of bore 27 in the valve holder 23 may be of only slightly larger diameter than the major diameter of ball 36 through the connecting portions 82, thereby to aid in aligning the ball within the bore. The flats 80 of ball valve 36 provide spacing within the bore 27 of valve holder 23 for fuel to flow either downwardly through the valve flow path or upwardly through the injector and out through return opening 60; however, the principal return path continues to be outside of valve body 23 and upwardly through the armature openings and the desired injection flow path continues to be through ports 34.

It is preferable that a sufficient portion of the normal convex surface of the ball 36 remain near its lower end to provide complete contact with the seating surface 30, even if the ball and armature should deviate slightly from coaxial alignment with the bore and seat in valve body 23. A further, but small, additional reduction in the mass of the moving system might be realized by forming small diameter flats on the upper and lowermost surfaces of the sphere of ball 36; however, in the illustrated embodiment the retention of those surfaces in a convex form is seen as preferable over the small reduction in mass.

As mentioned, it is desirable that the amount of fuel delivered per pulse vary linearly as a function of the electrical pulse width for pulse widths of as short a duration as possible, and the modified ball valve 36 of the invention provides an improvement in that regard relative to the same ball valve in an unmodified fully spherical form.

Although this invention has been shown and described with respect to detailed embodiments thereof, it will be understood by those skilled in the art that various changes in form and detail thereof may be made without departing from the spirit and scope of the claimed invention. For instance, the mass of the ball might be decreased by machining or boring holes thereinto; however, the hardness and the small diameter of the ball would probably require the use of the more expensive manufacturing techique of electro-discharge machining.

I claim:

1. In an electromagnetic fuel injector having a housing including a fuel inlet and a fuel discharge outlet, means forming a liquid flow path between said inlet and said discharge outlet, an annular seat in said flow path, a valve for displacement between open and closed positions relative to said valve seat and an electromagnetic circuit including an armature operatively connected to said valve for displacing said valve from one of said open and closed positions to the other in response to actuation of said electromagnetic circuit, the improvement wherein:

said armature is a disk having a major diameter and having a thickness substantially less than said major diameter, said valve is joined with said disk such that said armature and valve move in unison in response to said actuation of said electromagnetic circuit, said valve being substantially a sphere including a convex surface thereof for contact with said valve seat and including a plurality of surfaces recessed from the normal convex surface of the sphere to effect weight reduction thereof, said modified surfaces of said valve sphere comprising flat surfaces.

2. The fuel injector of claim 1 wherein said modified surfaces are four flats arranged successively in quadrature.

3. The fuel injector of claim 2 wherein said modified sphere of said valve is bonded to said armature.

4. The fuel injector of claim 3 wherein said armature is substantially circular and includes a plurality of flow apertures extending axially therethrough.

5. In an electromagnetic fuel injector having a housing including a fuel inlet and a fuel discharge outlet, means forming a liquid flow path between said inlet and said discharge outlet, an annular seat in said flow path, a valve for displacement between open and closed positions relative to said valve seat and an electromagnetic circuit including an armature operatively connected to said valve for displacing said valve from one of said open and closed positions to the other in response to actuation of said electromagnetic circuit, the improvement wherein:

said armature is a disk having a major diameter and having a thickness substantially less than said major diameter, said valve is joined with said disk such that said armature and valve move in unison in response to said actuation of said electromagnetic circuit, said valve being substantially a sphere including a convex surface thereof for contact with said valve seat and including at least one modified surface recessed from the normal convex surface of the sphere to effect weight reduction thereof, and wherein said means forming said flow path includes a tubular valve body, said valve seat being formed in said valve body at a position intermediate the ends thereof such that at least the major diameter of the ball valve transversely of the flow path is received within said tubular valve body at least when said valve is closed, said major diameter of the ball valve occurring at an opposite pair of convex surfaces, and said pair of ball valve convex surfaces being in closely spaced relation with said valve body for alignment thereby.

6. The fuel injector of claim 5 wherein the combined mass of said armature and said ball valve having said modified surfaces is at least 1.5% less than the combined mass of said same armature and said same ball valve as a complete sphere absent said modified surfaces.

7. The fuel injector of claim 5 wherein said housing further includes a fuel return outlet, means forming a continuous liquid path between said inlet and said return outlet, and wherein at least a portion of said continuous liquid path entirely bypasses the interior of said valve body.

* * * * *